United States Patent
Rosset et al.

(10) Patent No.: US 8,391,462 B2
(45) Date of Patent: Mar. 5, 2013

(54) COMMUNICATION PLATFORM FOR PROVIDING COMPUTER TELEPHONY INTEGRATION SERVICES TO REMOTE SUBSCRIBERS, AND ASSOCIATED METHOD

(75) Inventors: Jean-Michel Rosset, Saint Martin d'Uriage (FR); Brian Wyld, Brignoud (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2033 days.

(21) Appl. No.: 09/875,462

(22) Filed: Jun. 5, 2001

(65) Prior Publication Data

US 2002/0009188 A1    Jan. 24, 2002

(30) Foreign Application Priority Data

Jul. 24, 2000   (EP) .................................... 00410080

(51) Int. Cl.
*H04M 7/00* (2006.01)
(52) U.S. Cl. .................................. 379/219; 379/221.15
(58) Field of Classification Search .................. 379/219, 379/221.15
See application file for complete search history.

(56) References Cited

U.S. PATENT DOCUMENTS

| | | |
|---|---|---|
| 5,875,234 A | 2/1999 | Clayton et al. |
| 5,926,535 A | 7/1999 | Reynolds |
| 5,946,387 A | 8/1999 | Miloslavsky |
| 6,094,479 A * | 7/2000 | Lindeberg et al. ........ 379/220.01 |
| 6,496,702 B1 * | 12/2002 | Lockhart .................... 455/456.5 |
| 6,647,109 B1 * | 11/2003 | Henderson ..................... 379/219 |

FOREIGN PATENT DOCUMENTS

EP     0 821 510 A2    1/1998

OTHER PUBLICATIONS

O'Connell, John, et al., "Web-IN: Integrating Intelligent Networks and the Internet," *Hewlett Packard*, pp. 1-26 (1996).

* cited by examiner

*Primary Examiner* — Rasha Al Aubaidi

(57) ABSTRACT

A communication platform for providing computer/telephony integration services to remote subscribers comprises:
a hosted call switching unit in communication with an external telephone network or interconnected networks through a communications trunk;
for each subscriber, a subscriber telephony component, such as an intelligent agent, executed by processing means belonging to the communication platform and connected to an external subscriber's information system through a permanent private secure data channel, whereby said subscriber telephony component can communicate in a private manner with other information system components of said subscriber so as to be logically part of said information system, each subscriber component being capable of controlling said switching unit according to subscriber data;
resources available to each subscriber telephony component in association with call processing or routing;
means for allocating resources to each telephone call handled by a subscriber telephony component in response to data communication with said component through a secure interface.

25 Claims, 3 Drawing Sheets

COMMUNICATION PLATFORM FOR PROVIDING COMPUTER TELEPHONY INTEGRATION SERVICES TO REMOTE SUBSCRIBERS, AND ASSOCIATED METHOD

FIELD OF THE INVENTION

The present invention generally relates to computer/telephony integration, and more particularly to an architecture and related method for obtaining computer/telephony integration (such as value-added voice services, convergent voice-data services, etc.) with certain improved properties.

BACKGROUND OF THE INVENTION

The concepts of "Intelligent Networks" and "Advanced Intelligent Network" are known as involving an architecture to implement services such as intelligent call routing on a public telephony network. This technology comprises basically a routing database coupled in a quite direct manner to the telephone network. However, these services are mostly limited to voice telephony and have little or no interaction with the user's information systems.

There are also known so-called "Web Intelligent Networks" which have the purpose of solving some of the disadvantages of the classical intelligent network architecture by affording greater interactivity. It allows interaction between a subscriber's information system and a service control point (SCP) of an intelligent network via the Internet. By means of such interaction, the subscriber has control over the service execution. (see "Integrating the Intelligent Network and the Internet", O'Connell et al, ICIN 96).

Further, so-called computer telephony integration (CTI) technologies offer a wide range of solutions to integrate telephony with computers. CTI applications are numerous and include call-centers, unified messaging (basically text messages available together with voice messages through a single interface), interactive voice response systems, voice browsing systems, automatic call distribution, real time data fetch according to caller identification etc. However all standard CTI solutions are operated on customer premises equipment (CPE). Therefore, they require the subscriber to connect their computer equipment to the telephone network via PBXs or via special telephony interface cards.

A major drawback of such CTI applications is that the function of flexible call routing permitted by the intelligent network technologies is not available when such applications are CPE-based. The reason is that CTI processing is always done after the call has been delivered by the network.

Another known technology is the so-called network or virtual call centers, which provide network-based CTI solutions for call centers. Such technology allows the subscriber to globally control the routing functions of the network (including automatic call distribution) e.g. for routing calls among different sites of the subscriber.

Still another prior art is constituted by a tentative project by a consortium named "Parlay" (See parlay white papers at the Internet address www.parlay.org). Such project defines programming interfaces to implement services that control the network behavior. Such interfaces have the purpose of allowing to control the network behavior from software located in the subscriber's information system. However, this Parlay project only defines a programmatic API (Application Programming Interface, and implies that a suitable pre-existing intelligent network infrastructure is available that is capable of providing gateways between the network and the subscriber information system.

SUMMARY OF THE PRESENT INVENTION

A main objective of the present invention is to combine the generic and flexible character of CTI-based solutions to integrate telephony services with computer equipment and information systems, while enabling to deliver advanced telephony functions in a similar way as intelligent network techniques.

Another objective of the present invention is to provide a very cost-effective alternative to the deployment of classical intelligent network infrastructure, specially for small and medium-sized telecom service providers.

Still another objective of the present invention is to eliminate the need for costly CPE-based equipment, like PABXs or CTI platforms, and to provide subscribers with greater flexibility while minimizing costly and therefore risky financial investments.

In brief, this is achieved by a communication platform for providing computer/telephony integration services to remote subscribers, comprising:
a call switching unit for communicating with an external telephone network or interconnected networks through a communications trunk;
for each of one or more subscribers, a subscriber telephony component executed by processing means belonging to the communication platform and connectable to an external subscriber's information system through a private data channel, whereby said subscriber telephony component can communicate with other components of said subscriber's information system so as to be logically part of said information system, each subscriber telephony component being capable of controlling calls handled by said switching unit in response to data communication through the private channel.

Preferred aspects of embodiments of this communication platform are as follows:
each subscriber telephony component is comprised of an intelligent agent.
said permanent private secure data channel is a virtual private network link (VPN) connected to a network of the subscriber's information system.
said switching unit is capable of redirecting towards the telephone system of a given subscriber incoming calls intended to said subscriber through said communication trunk.
said switching unit is capable of redirecting towards the computer system of a given subscriber incoming calls intended to said subscriber through said private secure data channel.
the communication platform further comprises:
 call handling resources available to each of said subscriber telephony components,
 a storage for resource allocation data in association with each subscriber telephony component, and
 control means for allocating call handling resources to a given subscriber telephony component when handling a telephone call on the basis of said resource allocation data.
said call handling resources comprise voice processing resources.
said voice processing resources are connected to said switching unit.

the communication platform further comprises a billing system in communication with said control means for billing each subscriber according to call handling resource usage.

the communication platform further comprises at least one hosted switch hardware platform comprising:
said processing means for executing at least one subscriber telephony component,
said hosted call switching unit, and
control means for controlling said switching unit according to instructions by said executed subscriber telephony components.

According to a second aspect, the present invention provides a method for providing computer telephony integration to a subscriber, comprising the following steps:
providing a hardware communication platform, said communication platform comprising a hosted call switching unit in communication with an external telephone network or interconnected networks through a communications trunk, and call handling resources,
installing a subscriber telephony component for execution on said communication platform,
providing a permanent private secure data channel between said subscriber telephony component in said communication platform and an external information system of said subscriber,
for each incoming call intended for the subscriber, directing said call to said communication platform,
allocating call handling resources of said communication platform to said subscriber telephony component for handling said incoming call.

Preferred aspects of embodiments of the above method are as follows:

the method further comprises, before the call handling resources allocation step, a step of checking from resource allocation data stored by the communication platform whether there are sufficient call handling resources available for the current incoming call.

the method further comprises the additional step of periodically computing a bill to the subscriber according to call handling resource usage by the associated subscriber telephone component.

the method further comprises, in association with said installation step, the additional step of allocating to the subscriber telephone component security data for secure communications with said subscriber information system.

the method further comprises, in association with said installation step, the additional step of allocating to the subscriber telephone component security data for secure communications between said component and the rest of said communication platform.

BRIEF DESCRIPTION OF THE DRAWINGS

The present invention will now be described in greater detail with reference to the appended drawings, in which.

DETAILED DESCRIPTION OF A PREFERRED EMBODIMENT

I—Architecture Description

Figure 1:
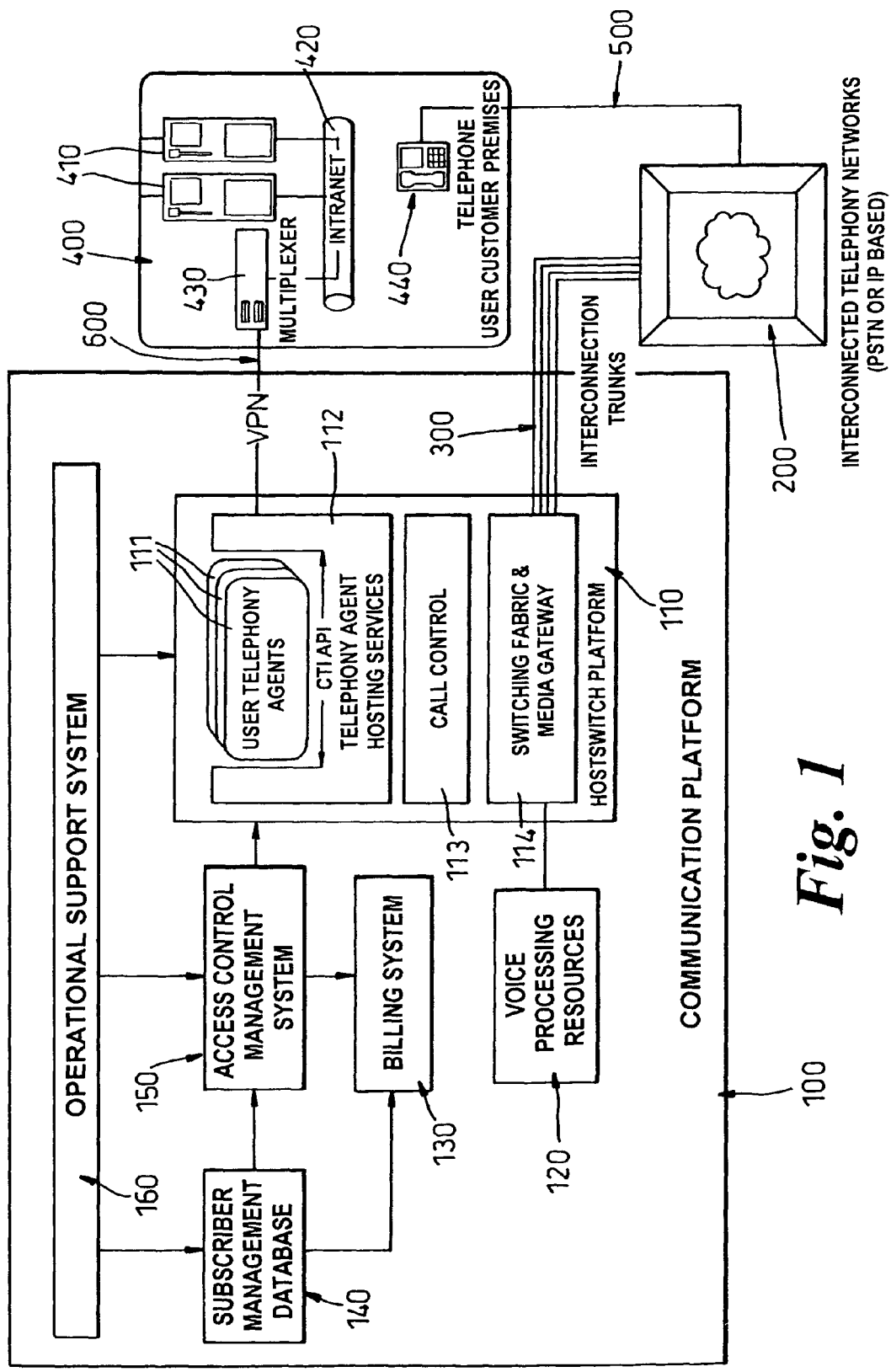
FIG. 1 is a block diagram of a telephony network, subscriber information system and communication platform embodying the present invention.

FIG. 1 illustrates a general architecture implementing the present invention.

1. Communication Platform

The present invention is mainly embodied by a communication platform 100 for providing telecommunication value added services to subscribers.

The communication platform comprises the following elements:

a) Hosted Switch 110

This is a computer-based node connected to a set of interconnected telephony networks 200 through interconnection trunks 300, in a manner known per se. The basic function of the hosted switch is to process and switch incoming calls that are routed to its switching array 114 via the telephony trunks. Action on the switching array 114 is performed by a User Telephony Agent 111, as will be described in the following, via a call control unit 113.

b) Voice Processing Resources 120

These are additional computer resources which can be used in combination with the hosted switch to perform advanced voice processing functions such as voice synthesis, automatic voice recognition, etc.

c) Billing System 130

This is a computer system that collects resource usage per subscriber and generates billing information.

d) Subscriber Management Database 140

This is another computer-based system that stores subscription information for each subscriber of the services afforded by the communication platform.

e) Access Control Management System 150

The basic function of this system is to supervise resource allocation control to user telephony agents, as they will be described in the following, and to track resource usage. This system can physically belong to the hosted switch hardware or it can be implemented on a separate computer system and control several hosted switches.

f) Operational Support System

This is a computer system that provides management and supervision information to the communication platform operators in order to insure the proper operations of the whole platform.

2. Operating Environment a) Interconnection

The communication platform is interconnected to the telecommunication networks 200 at the hosted switch level using telephony voice trunks 300, as indicated above. Regarding the trunk technology, conventional, state-of-the-art TDM (time division multiplexing) trunks can be used together with SS7 signaling or Voice over Internet Protocol (IP) trunks, using H323 or signaling according to the standard Session Invitation Protocol (SIP).

The communication platform 100 can either be deployed as a telephony network of its own, e.g., it is operated by a competitive local extension carrier (CLEC) that handles the interconnection with a separate, e.g. national network. Alternatively, it can be deployed as a sub-network or a Service Node. In the latter case, it may be connected as an adjunct node to classic switching systems or as an overlay of several nodes, in a manner known per se.

b) User Access

Reference 400 globally designates the subscriber's computer and telephone system including a number of conventional computers 410 connected together via an Intranet-type network 420. Reference 440 globally designates the telephony system of the subscriber, which is connected to the telephone network 200 via one or several lines 500. The computer system 410, 420 of the subscriber is connected to the hosted switch platform 110 of the communication platform 100 via a multiplexer 430 connected to one end of a so-called virtual private network (VPN) data channel (link) 600, the other end of which is connected to the hosted switch 110 as will be described in greater detail below.

It can be seen that the hosted switch 110 has no access to the telephony local loop of the subscriber. Instead it has a data communication to the user over the Internet via said VPN link 600.

This VPN link is used for data communication between a user telephony agent 111 hosted by the hosted switch 110 and the subscriber information system 410, 420.

It should be noted that, when the hosted switch needs to establish a voice communication (e.g. an outside call redirection) towards a called party in the subscriber system 400 (as will be described below in greater detail), the hosted switch has two options:
either it redirects the call towards a switching node or a
  third-party network (i.e. via network 200) that has a wireline or a radio connection to the called party;
or it uses packetized voice over the VPN link 600 if a sufficient bandwidth is available on this link and if the subscriber system 400 has the necessary equipment to receive voice calls over a data network (Internet telephony).

c) User Telephony Agents

"Intelligent Agents" are a recent concept in software engineering. Detailed information about such agents is available e.g. on the Web site www.agent.org.

Agents are generally described as software entities that:
execute autonomously with an internal representation of their user needs,
communicate with other agents or with the user according to predefined schemes;
monitor the state of their operating environment.

An important feature of the present invention is that the communication platform 100 uses User Telephony Agents (UTAs) 111 to provide network-based CTI services to subscribers (typically one UTA per subscriber).

From a hardware standpoint, each UTA is hosted by the hosted switch platform 110 to handle calls on behalf of the subscriber.

From the standpoint of software components, UTAs are logically part of the respective subscribers' information systems 410, 420. This is performed by a Telephony Agent hosting service provider 112 included in the hosted switch platform 110 and which provides a secured remote extension of the user's Intranet 420 via the above described VPN link 600 and multiplexer 430.

The main function of an UTA is to handle incoming telephone calls on behalf of the respective subscriber, using as necessary the call processing and voice processing resources available in the communication platform 100. The basic call control is performed by a call control unit 113 connected to the switching array 114.

Advantageously standard computer telephony application and programming interfaces (APIs), for instance interfaces such as Java Telephony Application and Programming Interfaces (JTAPI) or Java Intelligent Network (JAIN) interfaces, known per se, are provided in the hosted switch's telephony agent hosting service provider 112 and used for ensuring suitable interface between the agents 111 and the hosting service provider 112.

The voice processing resources 120 available in the communication platform 110 can be used by an UTA to interact with the caller in various ways, for instance to play or record announcements, to recognize DTMF signals, synthesize or recognize live voice, etc.

Another important aspect of the present invention is the ability of the hosting service provider 112 to control resource access and track resource usage for each UTA 111.

More particularly, each hosted UTA has corresponding resource allocation information stored in correspondence therewith in the subscriber management database 140, so that the UTA, via the access control management system 150, is prevented from using more resources than the user subscription permits.

Additionally, detailed records of resource usage (logging) by each UTA 111 are kept by the access control management system 150, e.g. for billing purposes by the billing system 130.

II—Services Description

First of all, each user telephony agent is a piece of software that must have been developed according to the subscriber requirements, and tested. This step involves standard software engineering activities that is outside the scope of the present invention. The starting point of the services provision is the UTA software code of a given subscriber.

Service provisioning involves the following steps:

1. UTA Packaging

Each time a new subscriber wants his UTA to be hosted by the communication platform 100, a process designated as UTA packaging is executed for combining the UTA code with authentication information so that the communication platform can perform appropriate security checking before safely letting the UTA use the communication platform resources.

UTA authentication has a double goal:
allowing the communication platform to check whether the code it is loading from the subscriber environment 400 is coming from a trusted and well-known source; this is done by appropriate, well known signature techniques;
allowing the UTA to set up a secure connection to the User's Intranet 420 via the VPN link 600; this is performed by providing the UTA with appropriate security certificates, encryption keys or equivalent in connection with corresponding means in the corresponding subscriber's information system 410, 420.

2. Subscription Providing

In association with the installation of the UTA 111 of a new subscriber, the communication platform's subscriber database 140 must be configured with corresponding subscription information so that the access control manager 150 can let the UTA use call-processing or voice-processing resources within the limits of the subscription.

This subscription information includes for instance the following information:
basic telephony resources allocated to a subscriber: mostly phone numbers and the number of lines (i.e. how many calls a UTA may simultaneously handle);
processing resources available to the UTA; as explained above, the communication platform controls all the resources used by an UTA, including CPU and memory (RAM, hard disk, etc.) usage, call and voice processing resources and networking resources at the VPN link level. The resources available to UTA to handle calls on a predefined number of lines are therefore provisioned to the Subscriber database.

3. Service Activation

When the steps described above have been successfully completed, the UTA is activated and the communication platform can start delivering and emitting calls to and from this UTA. These operations include the following:

a) incoming calls

Incoming calls are routed through the interconnection trunks 300 to the hosted switch which is in charge of handling the call (it should be noted in this regard that a communication platform may include several hosted switch platforms 110 each hosting several UTAs 111, so that an incoming call from network 200 first has to be routed to the appropriate platform 110).

The access control management system 150 then checks that the UTA of the subscriber to which this incoming call is intended has sufficient authorized resource capabilities to handle this incoming call in addition to other calls currently handled. If so, the call is delivered to the UTA.

The UTA then requests the appropriate resource allocation to handle the call. The UTA may choose to:

use local voice processing resources 120 of platform 100 to play announcements, record messages, interact with the caller using DTMF or automatic speech recognition, etc.;

cross-connect the call to another telephone address, inside or outside the communication platform (e.g. call bridging);

perform a sequence involving a combination of the above two possibilities.

Again, for each resource consumed by the UTA, the access control manager system 150 checks whether the UTA's allowed resources are sufficient.

When the call is complete, all the resources allocated to this call are released. The access control management system 150 then issues a report to the billing system 130 that keeps a history of resource consumption.

It should be noted here that, since the access control management system has real-time knowledge of resource usage for each UTA, prepaid billing schemes can be easily implemented.

As the UTA operates within the subscriber's information system 400 from the logical standpoint, it may interact in real time or close to real time with other agents or data (or more generally software components) located within anywhere in this information system. Of course, such interaction during the handling of an incoming call should be performed with sufficient speed to avoid any undesirable latency in providing vocal information to the caller after hanging off.

For avoiding such risk of latency without being dependent from e.g. abnormally low bandwidth at the VPN link 600 The communication platform can also provide local, caching storage to the UTA to satisfy latency requirements when serving large numbers of callers.

b) Outgoing Calls

The UTA 111 can also issue outgoing calls. Such calls are either handled by automatic voice processing resources 120 or connected to live agents through Voice over Internet Protocol (VoIP). An example of such application is the management of outgoing—outgoing to the telephone network, that is—marketing calls, preferably with predictive dialing techniques known per se.

Resource allocation and billing for outgoing calls is preferably similar or identical to the ones for incoming calls.

III—Practical Comparative Example

Figure 2:
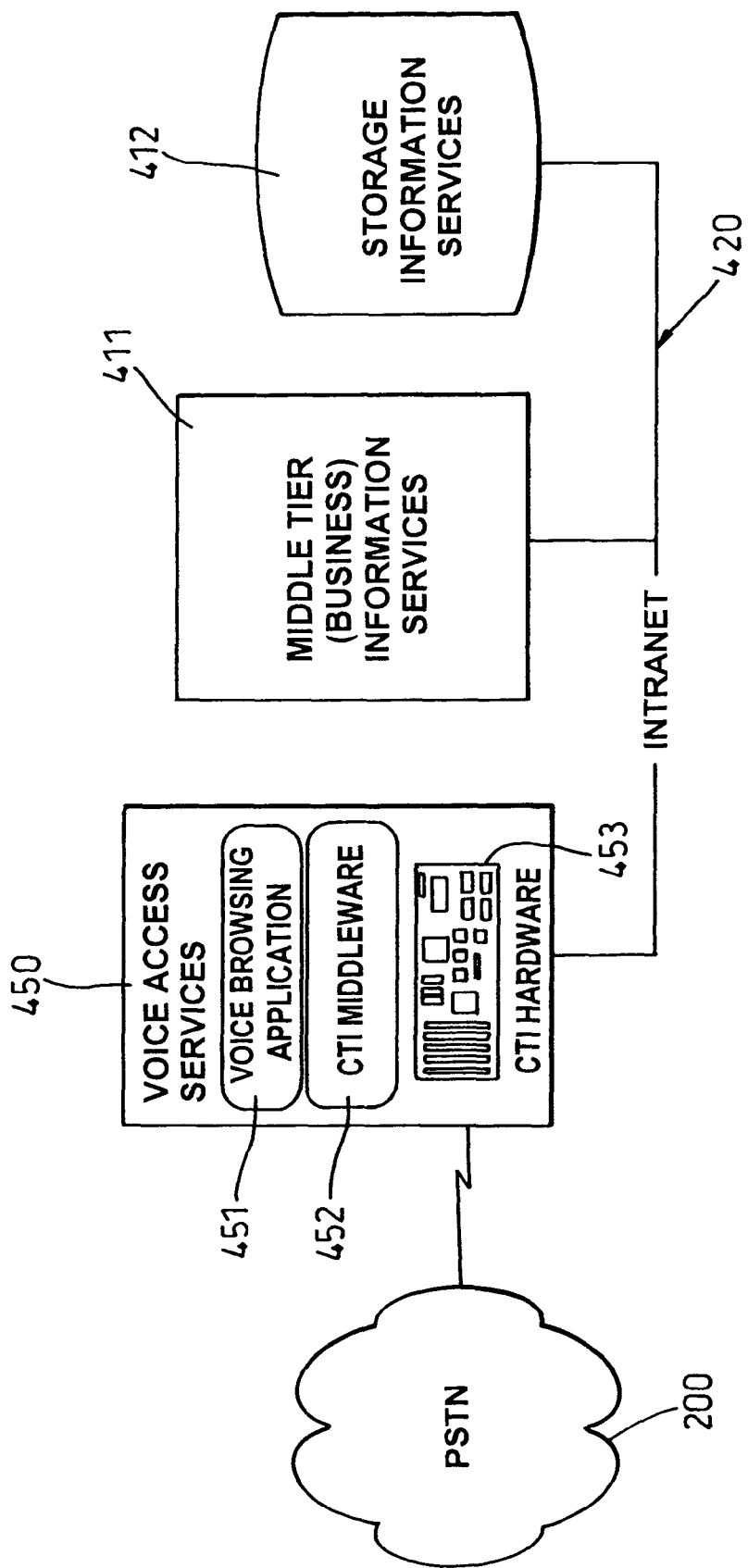
FIG. 2 is a block diagram of a practical embodiment of a computer telephony integration system according to the prior art.
Figure 3:
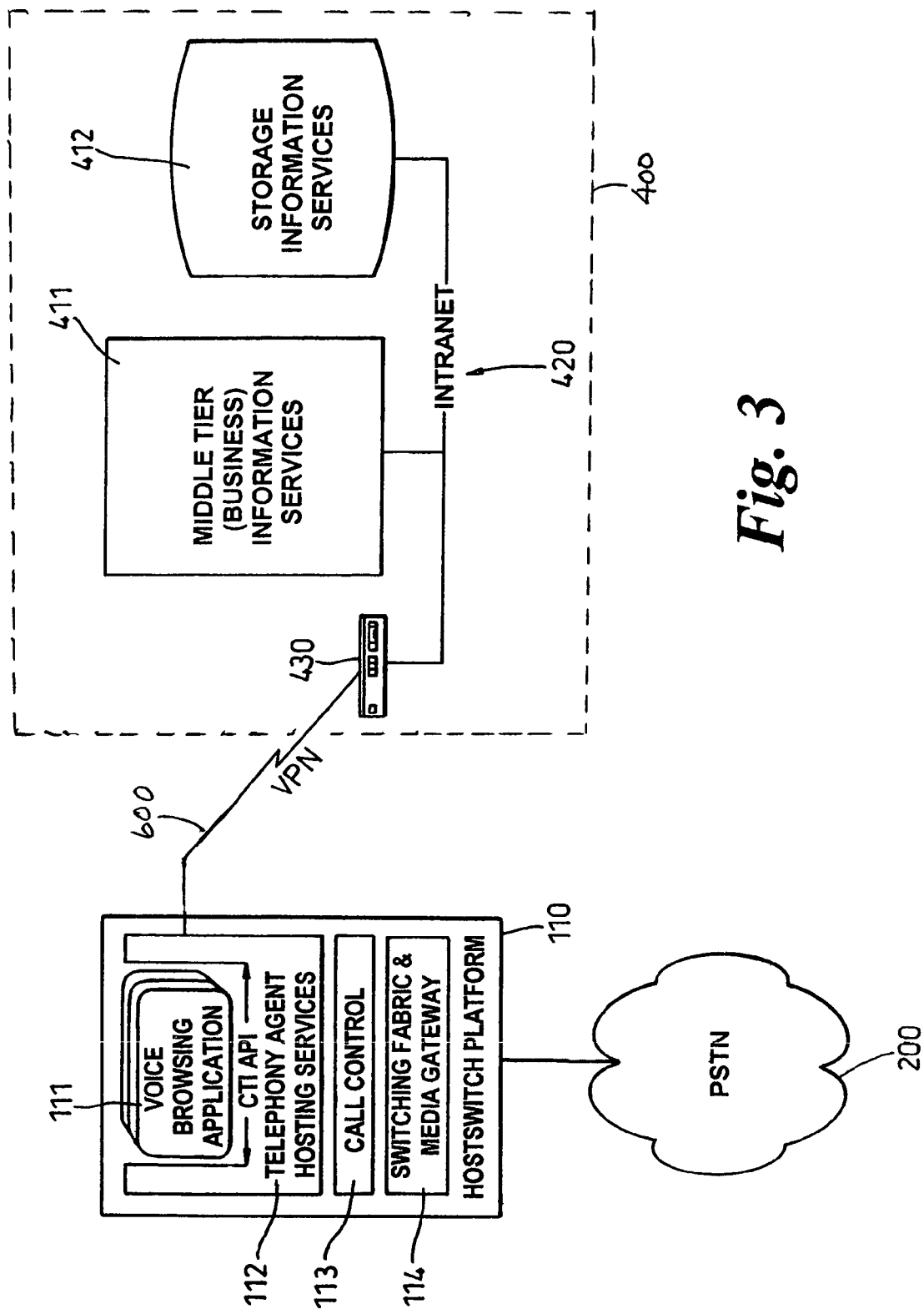
FIG. 3 is a block diagram of a practical embodiment of a computer telephony integration system according to the present invention.

A comparison between a standard CTI architecture and a CTI agent-based set-up according to the present invention will now be made with particular reference to FIGS. 2 and 3 in a practical application of voice browsing. In FIGS. 2 and 3, identical or similar parts as those of FIG. 1 are designated as far as possible by the same reference signs.

1. Voice Browsing Application Using Classic CTI

The basic purpose of a voice browsing application is to provide information stored in electronic form to callers. It allows the caller to navigate in the available information using the DTMF tones generated by his telephone keyboard or automatic voice recognition.

Voice is one medium to access information amongst many others (such as PC-based navigators, WAP telephones, Personal Digital Assistants, etc.), and a voice browsing application is typically designed using the well-known multi-tiered IP architecture as shown in FIG. 2.

Such architecture, entirely located at the subscriber premises, includes a first tier 450 of voice access services, a middle tier 411 of information services (typically business application services) and an final tier 412 of storage information services (typically data servers). The first tier 450 includes the voice browsing application itself 451, CTI middleware 452 and CTI hardware 453 for connection to the public telephone network 200.

More precisely, the first tier 450 houses the whole CTI hardware and software, with the following (known per se) features:

telephony access: telephone lines are pulled either directly from the telephony operator (in analog, or ISDN format) or indirectly via a PABX system;

telephony lines are connected to a computer system via telephony cards; depending on the number of telephony ports that need to be handled by the system, telephony cards may connect e.g. 1 to 4 telephony ports or 1 to 4 E1/T1 multiplexed ports that connect up to 120 ports;

voice processing functions provide automatic interaction with the caller; in the present example of a voice browsing application, these voice processing functions involve: information presentation e.g. text to speech, and information transfer to the telephony line and caller interaction via either DTMF tone or speech recognition; in most cases, these functions are handled by standard computers assisted by dedicated hardware.

2. Voice Browsing Using Inventive Agent-Based CTI

The communication platform 100 as described with reference to FIG. 1 allows a service provider to virtualize the voice front-end part of the voice browsing applications, as shown in FIG. 3.

The hosted switch 110, located in the network, hosts the voice browsing front-end and can access the needed specialized voice processing resources located in the communication platform (not shown in its entirety in FIG. 3).

Telephony lines are no longer terminated at the user site. Instead, the VPN link 600 extends the User's Intranet (420) to the remote hosted switch 110.

For callers, there is no difference between the two architectures. In both cases, the voice services can be provided using for instance geographic numbers, 800-type free phone numbers, shared revenue numbers, etc. . . .

It is understood from the foregoing that the communication platform according to the present invention is suitable for providing network based, hosted CTI services.

More particularly, the communication platform allows to combine the values of:

CTI technologies that permit the integration of communication services to the user's electronic information systems, intelligent network architectures that permit flexible and customized call routing schemes, hosted application services that reduce the capital needs for specific and often costly resources and provide a greater flexibility to adapt communication resources to instantaneous business needs.

Practical examples are numerous. For instance, the present invention allows an Internet service provider to provide, in addition to data services, vocal services (e.g. for unified messaging) which will be handled at the communication platform level, i.e. without major investments and with effective costs for the provider that will be substantially proportional to resource usage.

Another example is the capacity of the communication platform to allocate to a given User Telephony Agent different resources (including the number of available lines for incoming or outgoing calls) as a function of time.

The invention claimed is:

1. A communication platform for providing computer/telephony integration services to remote subscribers, comprising:
   a switch for communicating with an external telephone network or interconnected networks through a communications trunk;
   for each of one or more subscribers, a subscriber telephony component executed by a processor of the communication platform, wherein the subscriber telephony component is to connect to an external subscriber's information system through a private data channel, wherein said subscriber telephony component is to communicate with other components of said subscriber's information system so as to be logically part of said information system, wherein each subscriber telephony component is to control calls handled by said switch in response to data communication through the private data channel; and
   wherein the switch is to select one of the communications trunk and the private data channel for establishment of a voice communication call to a subscriber for which the voice communication call is intended and wherein the switch is to connect the voice communication call through the selected one of the communications trunk and the private data channel.

2. The communication platform according to claim 1, wherein each subscriber telephony component is comprised of an intelligent agent.

3. The communication platform according to claim 1, wherein said private data channel is a virtual private network link (VPN) connected to a network of the subscriber's information system.

4. The communication platform according to claim 1, wherein said switch is to determine whether sufficient bandwidth is available on the private data channel for establishment of the voice communication call and to select the private data channel for the voice communication call in response to a determination that the private data channel has sufficient bandwidth and to otherwise select the communication trunk for the establishment of the voice communication call.

5. The communication platform according to claim 1, wherein said switch is to packetize the voice communication call when the private data channel is selected for the establishment of the voice communication call.

6. The communication platform according to claim 1, further comprising:
   call handling resources available to each of said subscriber telephony components,
   storage for resource allocation data in association with each subscriber telephony component, and
   an operational support system to allocate the call handling resources to a given subscriber telephony component when handling a voice communication call on the basis of said resource allocation data.

7. The communication platform according to claim 6, wherein said call handling resources comprise voice processing resources.

8. The communication platform according to claim 7, wherein said voice processing resources are connected to said switch.

9. The communication platform according to claim 6, further comprising a billing system in communication with said controller to bill each subscriber according to call handling resource usage.

10. The communication platform according to claim 1, comprising at least one hosted switch hardware platform comprising:
    said processor to execute at least one of the subscriber telephony components,
    said switch, and
    an operational support system to control the switch according to instructions by said executed subscriber telephony components.

11. A method for providing computer telephony integration to a subscriber, said method comprising:
    providing a hardware communication platform, said communication platform comprising a hosted call switching unit in communication with an external telephone network or interconnected networks through a communications trunk, and call handling resources;
    installing a subscriber telephony component for execution on said communication platform;
    providing a private secure data channel between said subscriber telephony component in said communication platform and an external information system of said subscriber,
    for an incoming voice communication call intended for the subscriber, selecting, by the hosted call switching unit, one of the communications trunk and the private data channel for establishment of the voice communication call to the subscriber; and
    allocating call handling resources of said communication platform to said subscriber telephony component for handling said incoming call to connect the voice communication call through the selected one of the communications trunk and the private data channel.

12. The method according to claim 11, comprising, before allocating the call handling resources, checking from resource allocation data stored by the communication platform whether there are sufficient call handling resources available for the current voice communication call.

13. The method according to claim 12, comprising periodically computing a bill to the subscriber according to call handling resource usage by the associated subscriber telephone component.

14. The method according to claim 11, further comprising allocating to the subscriber telephone component security data for secure communications with said subscriber information system.

15. The method according to claim 11, further comprising allocating to the subscriber telephone component security data for secure communications between said component and the rest of said communication platform.

16. A communication platform for providing computer/telephony integration services to remote subscribers, comprising:
    a switch for communicating with an external telephone network or interconnected networks through a communications trunk;
    for each of one or more subscribers, an intelligent agent executed by a processor of the communication platform, wherein the intelligent agent is to connect to an external subscriber's information system through a private data channel, wherein said intelligent agent is to communicate with other components of said subscriber's information system so as to be logically part of said information system, wherein each intelligent agent is to control calls handled by said switch in response to data communication through the private data channel; and wherein the communications trunk and the private data channel comprise separate communications lines, and wherein the switch is to select one of the communications trunk and the private data channel for establishment of a voice communication call to a subscriber for which the voice communication call is intended and to connect the voice communication call through the selected one of the communications trunk and the private data channel.

17. The communication platform according to claim 16, wherein said private data channel is a virtual private network link (VPN) connected to a network of the subscriber's information system.

18. The communication platform according to claim 16, wherein said switch is to determine whether sufficient bandwidth is available on the private data channel for establishment of the voice communication call and to select the private data channel for the voice communication call in response to a determination that the private data channel has sufficient bandwidth and to otherwise select the communication trunk for the establishment of the voice communication call.

19. The communication platform according to claim 16, wherein said switch is to packetize the voice communication call when the private data channel is selected for the establishment of the voice communication call.

20. The communication platform according to claim 16, further comprising:
    call handling resources available to each of said intelligent agents,
    storage for resource allocation data in association with each intelligent agent, and
    an operational support system to allocate the call handling resources to a given intelligent agent when handling a voice communication call on the basis of said resource allocation data.

21. The communication platform according to claim 20, wherein said call handling resources comprise voice processing resources.

22. The communication platform according to claim 20, further comprising a billing system in communication with said controller to bill each subscriber according to call handling resource usage.

23. A communication platform for providing computer/telephony integration services to remote subscribers, comprising:
    a call switching unit for communicating with an external telephone network or interconnected networks through a communications trunk;
    for each of one or more subscribers, an intelligent agent executed by a processor of the communication platform, wherein the intelligent agent is to connect to an external subscriber's information system through a virtual private network (VPN) link, wherein said intelligent agent is to communicate with other components of said subscriber's information system so as to be logically part of said information system, wherein each intelligent agent is to control calls handled by said call switching unit in response to data communication through the VPN link; and
    wherein the call switching unit is to select the VPN link for establishment of a voice communication call to a subscriber for which the voice communication call is intended and to connect the voice communication call through the VPN link.

24. A communication platform for providing computer/telephony integration services to remote subscribers, comprising:
    a call switching unit for communicating with an external telephone network or interconnected networks through a communications trunk;
    for each of one or more subscribers, an intelligent agent executed by a processor of the communication platform, wherein the intelligent agent is to connect to an external subscriber's information system through a virtual private network (VPN) link, wherein said intelligent agent is to communicate with other components of said subscriber's information system so as to be logically part of said information system, wherein each intelligent agent is to control calls handled by said call switching unit in response to data communication through the VPN link;
    wherein the call switching unit is to select one of the communications trunk and the VPN link for establishment of a voice communication call to a subscriber for which the voice communication call is intended and wherein the call switching unit is to connect the voice communication call through the selected one of the communications trunk and the VPN link;
    call handling resources available to each of said intelligent agents;
    storage for resource allocation data in association with each intelligent agent, and a controller to call handling resources to a given intelligent agent when handling a telephone call on the basis of said resource allocation data; and
    a billing system in communication with said control means for billing each subscriber according to call handling resource usage.

25. A communication platform for providing computer/telephony integration services to remote subscribers, comprising:
    a hosted switch in communication with an external telephone network or interconnected networks through a communications trunk;
    for each subscriber, a subscriber telephony component executed by a processor of the communication platform, wherein the subscriber telephony component is to connect to an external subscriber's information system through a private data channel, wherein said subscriber telephony component is to communicate in a private manner with other information system components of said subscriber so as to be logically part of said information system, wherein each subscriber component is to control said hosted switch according to subscriber data;
    wherein the hosted switch is to select one of the communications trunk and the private data channel for establishment of a voice communication call to a subscriber for which the voice communication call is intended and wherein the hosted switch is to connect the voice communication call through the selected one of the communications trunk and the private data channel;
    resources available to each subscriber telephony component in association with call processing or routing; and
    wherein the resources are to be allocated to each telephone call handled by a subscriber telephony component in response to data communication with said component through a secure interface.

* * * * *